US 9,961,890 B2

(12) United States Patent
Niederhauser et al.

(10) Patent No.: US 9,961,890 B2
(45) Date of Patent: May 8, 2018

(54) FISH BAITS MADE FROM ULTRA STRONG HYDROGELS

(71) Applicants: University of Florida Research Foundation, Inc., Gainesville, FL (US); Fishing Physics, LLC, Chesterton, IN (US)

(72) Inventors: William R. Niederhauser, Kenai, AK (US); Thomas E. Angelini, Gainesville, FL (US); Wallace G. Sawyer, Gainesville, FL (US); Wallace C. Sawyer, Tampa, FL (US); Mike Norton, Chesterton, IN (US); Brent S. Sumerlin, Gainesville, FL (US); Gregory John Toupalik, Chesterton, IN (US)

(73) Assignees: UNIVERSITY OF FLORIDA RESEARCH FOUNDATION, INC., Gainesville, FL (US); FISHING PHYSICS, LLC, Chesterton, IN (US)

( * ) Notice: Subject to any disclaimer, the term of this patent is extended or adjusted under 35 U.S.C. 154(b) by 29 days.

(21) Appl. No.: 15/110,990

(22) PCT Filed: Jan. 13, 2015

(86) PCT No.: PCT/US2015/011166
§ 371 (c)(1),
(2) Date: Jul. 12, 2016

(87) PCT Pub. No.: WO2015/108855
PCT Pub. Date: Jul. 23, 2015

(65) Prior Publication Data
US 2016/0345566 A1    Dec. 1, 2016

Related U.S. Application Data

(60) Provisional application No. 61/927,243, filed on Jan. 14, 2014.

(51) Int. Cl.
*A01K 97/04*    (2006.01)
*A23K 40/20*    (2016.01)
(Continued)

(52) U.S. Cl.
CPC ............ *A01K 97/045* (2013.01); *A01K 85/00* (2013.01); *A23K 40/20* (2016.05); *A23K 50/80* (2016.05)

(58) Field of Classification Search
CPC ...... A01K 97/045; A01K 85/00; A23K 40/20; A23K 50/80
See application file for complete search history.

(56) References Cited

U.S. PATENT DOCUMENTS 1,045,716 A    11/1912    Mack et al.
1,291,614 A    1/1919    Noxon
(Continued)

FOREIGN PATENT DOCUMENTS

KR    101187258    10/2012

OTHER PUBLICATIONS

Isik, B. "Swelling Behavior of Acrylamide-2-Hydroxyethyl Methacrylate Hydrogels," *Turk J Chem*, 2000, pp. 147-156, vol. 24.
(Continued)

*Primary Examiner* — Trevor Love
(74) *Attorney, Agent, or Firm* — Saliwanchik, Lloyd & Eisenschenk

(57) ABSTRACT

A hydrogel fishing bait has a fish attractive scent infused into a water swollen hydrogel. The hydrogel can be a copolymer of at least one water miscible monomer and a cross-linking monomer. The hydrogel can be a terpolymer of hydroxyethyl methacrylate (HEMA), acrylamide, and a crosslinking monomer. The hydrogel terpolymer can be prepared in the shape of a fish or other fish attracting shape. The scent can be an amino acid, protein, fatty acid, sugar, or any combi- (Continued)

nation thereof, and can be from a natural or artificial source. The hydrogel can be filled with a fiber, mesh, or matrix material. The hydrogel can be an interpenetrating polymer network. The hydrogel can be biodegradable. The hydrogel baits when fully hydrated on their surface do not stick to each other.

22 Claims, 2 Drawing Sheets

(51) Int. Cl.
    *A23K 50/80*    (2016.01)
    *A01K 85/00*    (2006.01)

(56) References Cited

U.S. PATENT DOCUMENTS

| | | | |
|---|---|---|---|
| 3,421,899 A | | 1/1969 | Humphreys |
| 3,684,519 A | | 8/1972 | Combs |
| 3,875,302 A | | 4/1975 | Inoue |
| 3,876,803 A | | 4/1975 | Stephan et al. |
| 4,144,353 A | | 3/1979 | Zaragoza |
| 4,773,181 A | | 9/1988 | Radden |
| 4,887,376 A | * | 12/1989 | Sibley .................. A01K 85/01 426/1 |
| 4,927,643 A | | 5/1990 | D'Orazio et al. |
| 5,062,235 A | | 11/1991 | Cook, Jr. et al. |
| 5,089,277 A | | 2/1992 | Prochnow |
| 5,827,551 A | | 10/1998 | Prochnow et al. |
| 6,174,525 B1 | | 1/2001 | Kelley |
| 6,269,586 B1 | | 8/2001 | Jones |
| 2005/0287191 A1 | * | 12/2005 | Munro .................. C08F 2/44 424/443 |
| 2006/0269513 A1 | * | 11/2006 | Dodd .................. A01K 97/045 424/84 |

OTHER PUBLICATIONS

Nizam El-Din, H.M. et al., "Synthesis and Characterization of Hydroxyethyl Methacrylate/Acrylamide Responsive Hydrogels," *Journal of Applied Polymer Science*, 2005, pp. 1105-1115, vol. 95.

* cited by examiner

FISH BAITS MADE FROM ULTRA STRONG HYDROGELS

CROSS-REFERENCE TO RELATED APPLICATIONS

This application is the U.S. national stage application of International Patent Application No. PCT/US2015/011166, filed Jan. 13, 2015, which claims the benefit of U.S. Provisional Application Ser. No. 61/927,243, filed Jan. 14, 2014, the disclosures of which are hereby incorporated by reference in their entireties, including all figures, tables or drawings.

BACKGROUND OF INVENTION

Artificial fish eggs, other baits, and lures that have the same consistency, shape, flavor and color as the natural commodity have been sought for fishermen. For example, Mack et al., U.S. Pat. No. 1,045,716, teaches the treatment of tapioca kernels with sweetened water to yield a composition similar to fish spawn. Noxon, U.S. Pat. No. 1,291,614, teaches trout bait comprised of a globule of hydrated tapioca, colored to have the appearance of a salmon egg. Zaragoza, U.S. Pat. No. 4,144,353, teaches artificial fish eggs comprising grapes that have been treated with fish oil to impart fishlike odor. Other compositions of artificial fish eggs include a homogenous gel comprising protein, water and both a toughening and hardening compound, where the protein consists of animal gelatin, animal glue and casein, as taught in Humphreys, U.S. Pat. No. 3,421,899. Stephen et al., U.S. Pat. No. 3,876,803, teaches the manufacture of artificial fish eggs by mixing a gel forming proteinaceous material such as animal glue, fish glue, or fish gelation and water at a temperature above the sol-gel transition temperature of the solution in the absence of a tanning agent. This mixture forms a homogeneous liquid proteinaceous mass then undergoes further treatment to yield a fish bait with a cross-linked exterior surface and a gelatinous body. Radden, U.S. Pat. No. 4,773,181, teaches yarn strands which expand into spherical shapes where a different colored yarn simulates egg nucleus to make them appear natural.

Hydrogels are an interesting material for the preparation of baits. Inoue, U.S. Pat. No. 3,875,302, teaches a fishing bait prepared by forming an aqueous mixture of polyvinyl alcohol and fish powders, minced fish, fish oil or shell fish, and pouring the resultant mixture into a mold, freezing the mixture at temperatures below −5° C., and thawing the frozen mixture in air or water at room temperature. Egg-like bait can be prepared by forming the gelled polyvinyl alcohol around fish oil. Prochnow et al., U.S. Pat. No. 5,827,551, teaches a formulation for delivering fish attractants from a stable water-in-oil emulsion of petrolatum jelly, a water soluble delivery agent, a thickening agent, and a water soluble fish attractant, where the formulation is applied to the exterior surface of artificial lures to permit slow release of attractant into the water from the dissolving formulation. Prochnow, U.S. Pat. No. 5,089,277, teaches a lure comprising a water soluble moldable body having a putty-like consistency capable of being formed about a hook that imparts a controlled rate of dispersion of attractants in water, where the body comprises cellulose ether, poly(alkylene glycol), and water. Although attractive for their ability to interact with an aqueous environment, the use of hydrogel fishing baits to deliver water-based scents requires balancing many different factors, including: bait geometry and appearance, bait motion, colors, hook placement, durability, permeability, and water content. There are numerous compromises that must be made in an effort to balance the competition between scent release, durability, and manufacturability.

In spite of all of the effort over the centuries, the search for the ultimate fishing baits remains. A superior bait must be robust, effective, reusable, and, preferably, biodegradable. The ultimate bait remains a target for the sports and commercial angler.

BRIEF SUMMARY

A hydrogel fishing bait is formed as a terpolymer of hydroxyethyl methacrylate (HEMA), acrylamide, and a crosslinking monomer and contains a "sauce" to provide an attracting scent for fish. The crosslinking monomer can be N,N'-methylene-bis-acrylamide (BIS). The ration HEMA to acrylamide can vary over a wide range. The sauce can contain one or more amino acids, one or more proteins, one or more fatty acids, one or more sugars, or any combination thereof. The hydrogel fishing bait can include filler, such as a mesh, matrix, or a plurality of fibers, where the filler can be cellulose, cotton, polyethylene, polypropylene, nylon, or a metal. A fragrance can be included to masks offensive odors to fishermen. The fragrance can be from dimethyl sulfide, toscanol, fructone, anisic aldehyde, trans-2-nonenal, melonal, trimethylamine, or any combination thereof. The hydrogel fishing bait can include preservatives, antibacterial agents, antimicrobial agents, antioxidants, or any combination thereof. The hydrogel fishing bait can include one or more pigments, such as water-based airbrush paints. When fully hydrated the hydrogel fishing baits do not stick to hydrophilic surfaces such as other baits or fingers.

DETAILED DISCLOSURE

Figure 1:
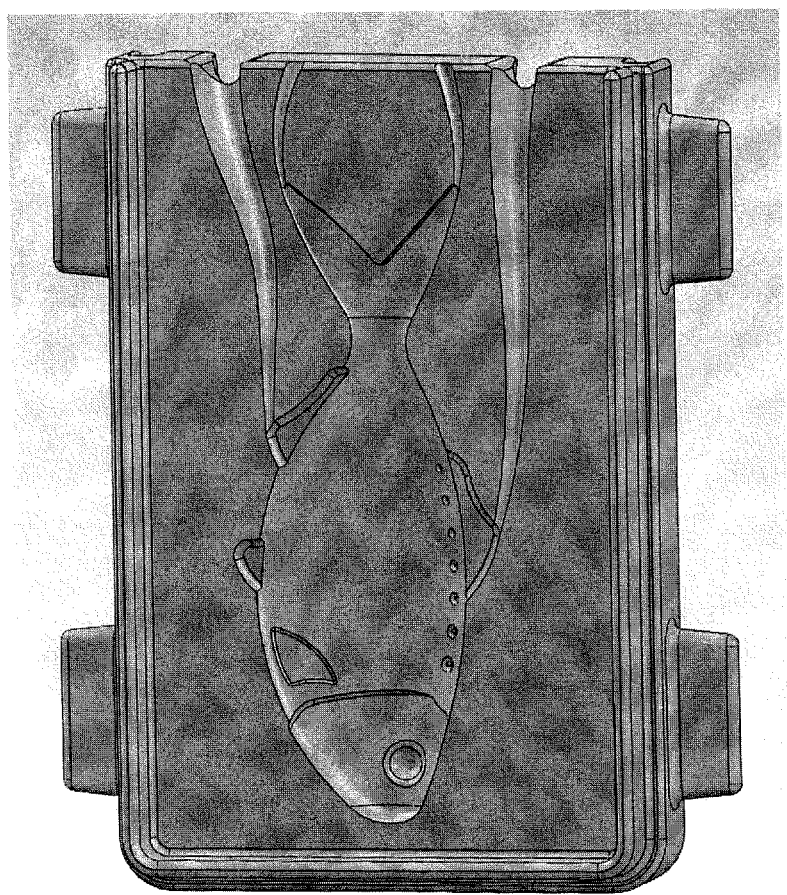
FIG. 1 shows an exemplary mold for a fish shaped bait, according to an embodiment of the invention, that has two pieces, which come together to form a cavity, where a lip type tapered labyrinth seal of the front piece and a matching recess on the back piece and four tabs positioned to open the molds, two larger ports are used to fill the fish, and two smaller ports off of the tail for venting.

Hydrogel baits, according to an embodiment of the invention, display high water content, low modulus, and high strength. In an embodiment of the invention, the hydrogel baits are molded. In embodiments of the invention, the hydrogel is soaked in scent and flavor attractants that will infuse the hydrogel. The high water content of the hydrogels allows a large loading capacity to extend the period of attractant release from the baits while fishing. The low modulus simulates the properties of animal or plant tissue, which causes fish to attempt to eat the bait and increase the chances of hooking the fish. The hydrogel bait displays a high strength to ensure that the bait can be placed on hooks without failure of the material, and to prevent tearing the bait from the hook by a fish.

The hydrogel baits, according to an embodiment of the invention, can comprise copolymers of acrylamide and hydroxyethyl methacrylate (HEMA). Though not examined for use in fishing lures or baits, acrylamide/HEMA based hydrogels have been prepared and examined for their swelling and their thermal decomposition behavior, Isik, *Turk. J. Chem.*, 2000, 24, 147-156 and Nizam et al. *J. Appl. Poly. Sci.*, 2005, 95, 1105-15. No report of other material properties, such as tear strength, or the ability to mold parts appears to have been disclosed. The copolymers are sufficiently tear resistant to be placed on a hook and used as the base of fishing bait. In embodiments of the invention, the hydrogel can be any proportions of acrylamide and HEMA. The hydrogels are prepared in aqueous solution in a swollen state, such that significant distortion of the size and shape does not occur when the baits are placed in water. The hydrogels can be prepared with any crosslinking monomer that has a methacrylate, acrylate, or acrylamide functionality. The polymerization can be carried out by any free-radical initiation system, including any thermal, reduction/oxidation (redox), photochemical, or any other radical generating system. Although all exemplary embodiments are redox initiation systems, embodiments of the invention are not so limited and a mold that permits photocuring or thermal curing can be used. Photochemical initiation can occur using initiators that undergo radical formation when irradiated with IR, visible, or UV light. Curing can be promoted or accelerated by reducing the concentration of oxygen in the monomer, crosslinker and initiator mixture prior to curing. Reduction in oxygen can include purging or sparging with nitrogen or other inert gas, employing a freeze-evacuate-thaw cycle, or applying vacuum with less volatile monomer mixtures. In all cases, sufficient initiator is used to scavenge all oxygen in the mixture and initiating curing.

In addition to or alternative to the copolymers formed from the monomers acrylamide and HEMA, in embodiments of the invention, the hydrogels can include repeating units from monomers that include, but are not limited to, acrylamides, methacrylamides, acrylates, methacrylates, acrylic acid, methacrylic acid, other alkyl acrylic acids, vinyl esters, vinyl amides, vinyl amines, and vinyl acetate, which can result in vinyl alcohol repeating units upon ester hydrolysis. In embodiments of the invention, the cross-linking monomers can be any di-, tri-, tetra-, penta-vinyl crosslinker. The monomers or cross-linkers can be water soluble oligomers and polymers with vinyl polymerizable functionality (macromers), including, but not limited to, polyethyleneglycol (PEG) that is mono-terminal and/or di-terminal with an vinyl polymerizable group, such as, but not limited to, PEG-methacrylates or PEG-acrylates. Hydrogels from acrylamide or methacrylamide crosslinkers, in general, display slow biodegradation in aqueous environments relative to acrylate or methacrylate crosslinkers. The crosslinkers can include one or more biodegradable links, for example a biodegradable polymer, such as but not limited to, poly(lactic acid) (PLA) or poly(caprolactone) (PCL), such that lost hydrogel baits will biodegrade in the environment.

In an embodiment of the invention, polymer may be dispersed or dissolved in the mixture of hydrogel monomers, cross-linkers and initiator prior to curing to give a final hydrogel that is an interpenetrating network, where the additional polymer can enhance the final hydrogels toughness/flexibility, mechanical properties, adsorption of attractants, release from molds after curing, or provide any other benefit.

The hydrogel bait can be cured within a mold, or can be cured in bulk and pieces of the bulk article can be cut from the mold, as desired, for use as the hydrogel bait. In embodiments of the invention, the bait can be in the shape of a fish or other aquatic animal for attaching to a hook, where the hydro gel article must have good tear strength, or the bait can be an attractant to be placed in a trap, where the tear strength is not critical. The baits can be pigmented to have any color. The baits have "scents" added for attraction of the fish and can have "fragrances" added to be non-offensive to the fisherman. The bait can include preservatives, antibacterial agents, antimicrobial agents, or antioxidants for storage stability. A polymer can be included, for example, poly vinyl alcohol, after curing of the hydrogel to act as a coating that inhibits cohesion or adhesion between hydrogel baits.

The scent is an attractant to the fish that can be amino acids, proteins, oils, fatty acids, sugars, or any combination thereof from natural or synthetic sources. The scent can include vitamins and other components that are attractive to fish. The scent can be included in the formulation before curing of the hydrogel, or can be infused into the hydrogel after preparation of the hydrogel.

A reinforcing matrix or filler, such as a molded or woven cloth or a fibrous mesh can be included with the uncured hydrogel precursors prior to molding such that the molded article has an enhanced tear resistance and has the ability to be retained on a hook during use. The matrix or filler material can be a cotton fiber or other cellulose based fiber, polyethylene, polypropylene, nylon or any other material, including metallic fibers or woven pieces.

The molds used during hydrogel bait formation may be derived from any common material, including, but not limited to, polypropylene, nylon or other polyamide, polycarbonate, poly(tetrafluoroethylene), polyethylene. Transparent molds that allow the wavelength used for photoinitiation can be employed. The mold material is chosen such that release of the hydrogel bait after curing can be carried out readily without tearing. As most monomers that can be used for the preparation of the hydrogels result in shrinkage upon curing, the use of a macromer can facilitate release from the mold after curing as the percent shrinkage can be minimized. In an embodiment of the invention, some monomers that expand upon polymerization can be included, for example, spiro-orthocarbonate comprising monomer.

In embodiments of the invention, facile removal of the hydrogel from the mold is achieved by coating the mold with a release agent prior to curing, incorporating an additional component into the cure mixture prior to curing or submersing the molds in water or an alcohol prior to opening, wherein the water or alcohol can infuse into the mold which has experienced shrinkage upon polymerization. The mold can be opened while submerged in water or an alcohol. Mold release agents may be water-based or organic-based. Silicone release agents, petroleum jelly, water-soluble lubricants, water-soluble polymers (e.g., poly(vinyl alcohol) or surfactants (low molecular weight or polymeric) can be used.

METHODS AND MATERIALS

Elastogel is a gelled terpolymer of acrylamide, hydroxyethyl methacrylate (HEMA) and N,N'-methylene-bis-acrylamide (BIS) initiated by ammonium persulfate (APS) and tetramethylethylenediamine (TEMED). This contrasts with typical polyHEMA hydrogels where a neat mixture of methacrylic acid, HEMA, and the crosslinking monomer EGDMA is cured with a very low level of initiator, because of the danger of decomposition due to a runaway exothermic polymerization, and forms a gel that exhibits numerous manufacturing, storage, and handling issues. Elastogel is cured slowly in water using moderate concentrations of initiator, which slows the polymerization and improves the mechanical integrity of the hydrogel.

Terpolymer hydrogels with water contents between 40% and 90% water were prepared. Elastogel is tough and can be stretched more than 500%. Elastogel is very soft, slippery, slightly translucent to opaque, and absorbs relatively little additional water, about 10%, after extended periods of time in water. It accepts colors readily and can be pigmented into very bright and colorful baits. A typical 1 L formulation is: 50 grams of acrylamide; 450 grams of HEMA; 550 milliliters of water; and 0.25 grams of BIS, which is cured by addition of 25 milliliters of 10% solution of APS in water and 25 milliliters of 10% solution of TEMED in water. After approximately 30-40 minutes, the hydrogel can be removed from a mold and handled. Complete cure takes 5-12 hours and no additional water or oxygen should be exposed to the gel until it has been completely cured, and baits should not be submerged in water before 5-12 hours of cure, although the baits can be exposed to air, if necessary. For baits kept in molds from 5-12 hours, shrinkage of about 2% occurs which facilitates removal from the molds to avoid any tearing. The removed bait is placed in a damp, sealed container, such as a plastic bag. Optical microscopy reveals the bait to be a very homogenous material with any pores below 10 µm in size.

A high modulus low extensibility (HMLE) Elastogel, for casting, trades-off stiffness for toughness. A typical (HMLE) Elastogel formulation is: 50 grams of acrylamide; 400 grams of HEMA; 750 milliliters of water; 0.25 grams of BIS, which is cured with 25 milliliters of 10% APS in water and 5 milliliters of 10% TEMED in water.

Another formulation forms a "Hydro-Foam" that is texture and relatively fragile, similar to that of cooked crab-claw meat, being spongy and easily fractured or torn. A typical formulation for Hydro-Foam is: 50 grams of Acrylamide; 300 grams of HEMA; 675 milliliters of water; and 0.50 grams of BIS that is cured by the addition of 2.5 milliliters of 10% APS solution in water and 2.5 milliliters of 10% TEMED in water.

The Hydro-Foam was characterized using optical microscopy and has a very open pore structure that evolves over an extended period of time. It is very opaque and has a chalky appearance where when color is added results in pale pastel hydrogels. Hydro-Foam readily absorbs scents and is an excellent bottom-bait material when reinforced with a mesh. Jigs and swim-baits made from Hydro-Foam are too delicate and split readily. Hydro-Foam can be used as a chum block; as pot bait for crab, fish, or lobster; or for other trap based fisheries. Appropriate types of mesh included into the molds are cotton-based materials: gauze, cheesecloth, rope, or open nylon mesh.

Various thermoplastic molds were prepared that allowed excellent molding. The more useful molds were those of polytetrafluoroethylene (PTFE), which open easily to yield very clean baits with a beautiful surface fidelity, and are easy to clean and handle, and those of polypropylene (PP), which open easily and easily release hydrogels from the molds, and are durable.

Molds were prepared such that the combined resin-initiator solutions could be filled within approximately 10 minutes such that viscosity increases do not limit the process. An exemplary mold for fish shaped baits is shown in FIG. 1. The bait can be formed into various shapes including, but not limited to: swimming shads—3 and 4 inches; bottom jigs—3, 4, 6, and 10 inches; bottom fish—4 inches; and kicking shrimp—3 and 4 inches. The simple stacked molds have a single ungreased highly tapered mechanical labyrinth seal. Bait formulations are poured through openings in excess of a millimeter in diameter, for example, about 3 millimeters or such that a 1:1 aspect ratio of small feature is maintained. Filling and venting locations are selected according to the bait design where the vents are a place for hook placement. All molds have specific filling locations and separate vent locations, where filling is carried out through the smaller features. Molds were polished and free of all tooling marks, such that the surfaces of the molded baits were free of defects to permit quick turnaround from opening to pouring.

The molds were opened while they were still wet. If the hydrogels were fully cured or "dried out" sticking and tearing occurred during rapid opening. Hand opened molds provided defect free parts after five hours of curing. The molds were opened by pulling on the angular tabs designed into the sides of the mold. Mechanically assisted opening can be carried out by sliding through angled channel to mechanically separate the molds.

Figure 2:
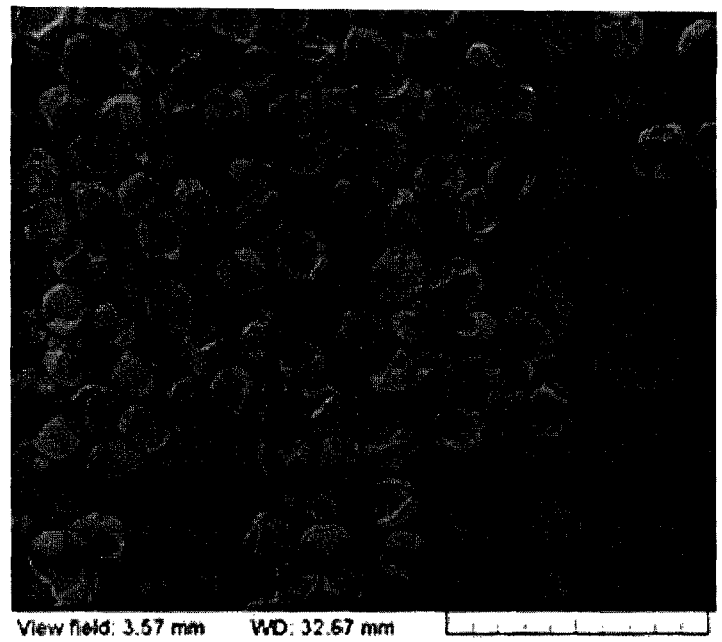
FIG. 2 shows scanning electron microscope images of decapsulated shrimp eggs used for the attractant sauce, according to an embodiment of the invention, which reveal a thin membrane.
Figure 2:

A series of attractant "sauces" that will appeal to both the fish and the fisherman are readily manufactured. A base solution is common for all sauces. The base solution is derived from breaking and dissolving shrimp eggs from dehydrated "Decapsulated Shrimp Eggs" also called "Decapsulated Artemia Cysts", as shown in FIG. 2. The shrimp eggs are roughly 50% protein and amino acids, and 20% soluble fatty acids, commonly used for feeding invertebrates and aquarium fish that require a high protein zooplankton diet. Breaking the encapsulating membrane was performed by grinding the eggs. Using a commercially available high-energy powder grinder, the eggs were reduced to about 2 µm powders. Other grinding methods to grind the eggs include Hauschild mixing and jet milling, also called micronizing. Grinding frozen eggs in an espresso grinder, a burr grinder or blade grinders also provides finer powders of shrimp eggs. The ground shrimp eggs were added to warm water and allowed to hydrate for 24-36 hours. The more concentrated the base solution, the more effective the sauce in catching fish. The base solution for experimental trials was 5% decapsulated shrimp eggs, 83.5% water, 0.5% trypsin, 0.5% salt, 0.5% sugar, and trace vitamins. Trypsin and vitamins were added to the warm base recipe. Trypsin is included to break membranes for releasing amino acids, proteins, oils, and fatty acids into the solution. The base solution was kept warm, at approximately 100° F. to optimize trypsin digestion of the membrane. Shrimp egg solids slowly settle from solution and can be easily removed from the liquid portion of the solution retained for preparation of the sauce. The sauces were further clarified by centrifugation.

A solution of Trypsin, Salt, Sugar, and Vitamins can be added to a volume of other bait, such as, crawfish, special shrimp, or salmon eggs, and held for a 12-24 hour period, with antimicrobial agents to prevent a foul odor from becoming dominant.

Fragrance is added for the customer's appeal and not for the fish. For example, the flavor packs from Raman noodle Shrimp flavor, when added to the base solution, results in a pleasant smelling yet highly effective bait. The base solution has a rich shrimp odor that can be bottled as prepared. A garlic fragrance was imparted by the addition of dimethyl sulfide to yield bait with a fragrance reminiscent of a low tide type marine smell. It has a strong mid-note, and can be added in minute quantities to provide a natural marine marsh base-note smell. Alternatively a 99% *Allium Sativum* extract stabilized with citric acid and ascorbic acid is sold as a marine attractant and food supplement. For example, Kent Marine markets the extract under the name "Garlic Xtreme". A garlic sauce was prepared by adding 0.05% of Garlic Xtreme to the base solution with an additional 0.01% of dimethyl sulfide into the solution. An anise fragrance is imparted to a sauce by adding 0.2% toscanol, 0.1% fructone, and 0.1% anisic aldehyde to the base solution. A sauce with a cucumber-melon fragrance was prepared by including 0.05% trans-2-nonenal, 0.1% fructone, and 0.03% melonal. A fish fragrance is imparted to a sauce by the addition of a 40% solution of trimethylamine in water to the base solution.

Any clean water source can be used in the manufacture of the hydrogels. The hydrogel includes an antibacterial and antimicrobial agent. For exemplary purposes, triclosan, at concentrations as low as 1 mg per liter, was added to baits and was found to prevents biological activity. Triclosan is readily soluble in HEMA and was added to HEMA at an appropriate concentration to yield a 0.1% concentration in hydrogel baits. This triclosan level in baits and sauces did not appear to act as a fish repellant. For example: in a 1 liter mixture of Elasto-Gel a 1 gram triclosan addition gives a 0.1% concentration of triclosan. By adding 1 gram of triclosan to 250 grams of HEMA, the resulting recipe will give the correct concentration. Triclosan is readily dissolved in pure Ethanol, and 50% triclosan in ethanol was added to the base solution to arrive at a 0.1% triclosan concentration.

Color is added to the hydrogel bait using SpectraTex water-based airbrush paints as these paints have color particles that are sufficiently large enough to become trapped in the hydrogel material. Paints were added to the based hydrogel recipes without interference with curing. High concentrations of paint in the hydrogels facilitate mold removal. Due to the rapid changes in viscosity with cure time very little detectable settling of pigments occurs during manufacturing of the bait. Typical concentrations for various colors are: Neon Orange—0.3% to 2.5%, Neon Pink—0.1% to 1.25%, Neon Purple Berry—0.1% to 1.25%, Neon Lemon—0.1% to 1.25%, Neon Green—0.1% to 0.25%, Neon Red or Flag Red—0.1% to 1.25%, and Opaque Jet Black—1%.

The hydrogel baits readily stick to each other producing a nearly inseparable mass of baits, and will stick to any hydrophilic object including one's fingers after removal from the molds. To alleviate any sticking problem, hydration of the baits ensures baits will not stick together.

Waste water, shrimp particles from the sauce manufacture, and all sprue and vent hydrogel material can be combined with an acrylamide hydrogel mixture and, optionally, other attractants, and cured into a sold slab that can be used as crab-bait. For example, a solution of Trypsin, Salt, Sugar, and Vitamins and the crab-bait formulation can be combined with a single pound of herring or squid to yield about 50 pounds of high performance crab-bait. The acrylamide hydrogel mixture readily swells when soaked for extended periods of time in water. An exemplary formulation is 100 grams of acrylamide, 950 milliliters of water, and 0.25 grams of BIS. An exemplary curing solution is 25 milliliters of 10% by weight solution of APS in water and 25 milliliters of 10% by weight solution of TEMED in water. The waste infused material sets up into a solid gel in minutes, and can be handled easily and extracted from molds within 15 minutes.

All patents and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application.

We claim:

1. A hydrogel fishing bait, comprising a hydrogel of water and a terpolymer comprising water miscible repeating units from hydroxyethyl methacrylate (HEMA) and acrylamide and a crosslinking repeating unit, wherein the hydrogel is in the shape of an aquatic animal, and wherein the hydrogel is infused with a sauce comprising scent comprising molecules.

2. The hydrogel fishing bait of claim 1, wherein the water miscible repeating units are formed by the polymerization of a monomer mixture further comprising methacrylamide, acrylate, methacrylate, acrylic acid, methacrylic acid, $C_2$-$C_8$ alkyl acrylic acids, vinyl ester, vinyl amide, vinyl amine, and/or vinyl acetate or from a hydrolysis product therefrom.

3. The hydrogel fishing bait of claim 1, wherein the crosslinking monomer is N,N'-methylene-bis-acrylamide (BIS).

4. The hydrogel fishing bait of claim 1, wherein the crosslinking repeating unit comprises 1-5 polymerizable vinyl groups.

5. The hydrogel fishing bait of claim 1, wherein the scent comprising molecules comprise at least one amino acid, protein, fatty acid, or sugar.

6. The hydrogel fishing bait of claim 1, further comprising a filler.

7. The hydrogel fishing bait of claim 6, wherein the filler is a mesh, matrix, or a plurality of fibers.

8. The hydrogel fishing bait of claim 6, wherein the filler comprises cellulose, cotton, polyethylene, polypropylene, nylon, or a metal.

9. The hydrogel fishing bait of claim 1, further comprising a fragrance.

10. The hydrogel fishing bait of claim 9, wherein the fragrance comprises dimethyl sulfide, toscanol, fructone, anisic aldehyde, trans-2-nonenal, melonal, trimethylamine, or any combination thereof.

11. The hydrogel fishing bait of claim 1, further comprising preservatives, antibacterial agents, antimicrobial agents, antioxidants, or any combination thereof.

12. The hydrogel fishing bait of claim 1, further comprising one or more pigments.

13. The hydrogel fishing bait of claim 12, wherein the pigments are provided by at least one water-based airbrush paint.

14. The hydrogel fishing bait of claim 1, wherein at least one of the water miscible repeating units and/or a crosslinking repeating unit comprises one or more macromers.

15. The hydrogel fishing bait of claim 14, wherein the macromer is a polyethylene glycol that is mono-terminated or di-terminated with an acrylate or methacrylate group.

16. The hydrogel fishing bait of claim 1, further comprising repeating units from one or more monomers that expands the hydrogel in volume upon polymerization.

17. The hydrogel fishing bait of claim 1, wherein the crosslinking monomer has at least one biodegradable link.

18. The hydrogel fishing bait of claim 1, further comprising a second polymer or copolymer that forms an interpenetrating polymer network with the copolymer comprising at least one water miscible repeating unit and a crosslinking repeating unit.

19. A method of forming a hydrogel fishing bait according to claim 1, comprising:

providing a plurality of monomers and/or macromers that provide water miscible repeating unit to a polymer wherein the plurality of monomers comprise hydroxyethyl methacrylate (HEMA) and acrylamide;

providing at least one crosslinking monomer;

providing a radical initiator;

combining the plurality of monomers and/or macromers, the crosslinking monomer, the radical initiator, and solvent comprising water to form a water comprising polymerization solution or suspension;

filling a mold in a shape of an aquatic animal with the water comprising polymerization solution or suspension;

polymerizing the polymerization solution in the mold to form a crosslinked hydrogel article;

removing the crosslinked hydrogel article from the mold; and combining the water comprising polymerization solution or suspension or the crosslinked hydrogel article with a sauce comprising at least one attracting scent comprising molecule to form a hydrogel fishing bait.

20. The method according to claim 19, further comprising combining a filler with the plurality of monomers and/or macromers, the crosslinking monomer, the radical initiator, and solvent comprising water to form a water comprising polymerization suspension.

21. The method according to claim 19, further comprising combining a second polymer or copolymer with the water comprising polymerization solution or suspension, wherein the crosslinked hydrogel article comprises an interpenetrating polymer network.

22. The method according to claim 19, wherein demolding comprises submerging the mold in a water comprising solution and opening the mold.

* * * * *